United States Patent
Talbot et al.

(10) Patent No.: US 6,195,972 B1
(45) Date of Patent: Mar. 6, 2001

(54) FORE AND AFT MOVEMENT OF A PICKUP REEL OF A CROP HARVESTING HEADER

(75) Inventors: Francois R. Talbot; Bruce R. Shearer, both of Manitoba (CA)

(73) Assignee: MacDon Industries Ltd., Winnipeg (CA)

( * ) Notice: Subject to any disclaimer, the term of this patent is extended or adjusted under 35 U.S.C. 154(b) by 0 days.

(21) Appl. No.: 09/407,875

(22) Filed: Sep. 29, 1999

(51) Int. Cl.⁷ ............................. A01D 43/02; A01D 89/00
(52) U.S. Cl. ..................... 56/364; 56/220; 56/221; 56/227
(58) Field of Search ..................... 56/364, 221, 223, 56/220, 365, 370, 366, 374, 227, 376, 379, 380, 384, 396

(56) References Cited

U.S. PATENT DOCUMENTS

| | | | |
|---|---|---|---|
| 2,795,920 | * 6/1957 | Steuerwald | 56/221 |
| 3,945,180 | * 3/1976 | Sinclair | 56/221 |
| 4,008,558 | * 2/1977 | Mott | 56/226 |
| 4,214,428 | * 7/1980 | Caraway | 56/341 |
| 4,280,318 | * 7/1981 | Koch | 56/221 |
| 4,368,609 | * 1/1983 | Hutchinson et al. | 56/221 |
| 4,752,809 | 6/1988 | Ito . | |
| 4,776,155 | 10/1988 | Fox et al. . | |
| 4,932,197 | * 6/1990 | Allen | 56/377 |
| 5,768,870 | 6/1998 | Talbot et al. . | |

* cited by examiner

Primary Examiner—Robert E. Pezzuto
Assistant Examiner—Arpad Fabian Kovacs
(74) Attorney, Agent, or Firm—Adrian D. Battison

(57) ABSTRACT

A crop harvesting header includes a reel mounted on a pair of forwardly extending arms carried on a header frame above a table and cutting knife. The reel is rotatable about a longitudinal axis and includes bats with fingers which pivot each about a respective bat axis so the angle of the fingers varies as the reel rotates. The angle of the fingers can be varied to increase and decrease the angle at the knife. The arms include a forward portion which is arranged at an angle to a main portion so as to be inclined downwardly and forwardly therefrom. As the reel supports on the arms is moved forwardly along the arms and engages onto the forward portion, the reel is moved downwardly and forwardly which simultaneously changes the angle to provide a more aggressive action as the reel is moved forwardly of the knife.

10 Claims, 4 Drawing Sheets

FORE AND AFT MOVEMENT OF A PICKUP REEL OF A CROP HARVESTING HEADER

This invention relates to a crop harvesting header of the type including a reel and particularly to an arrangement for adjusting the fore and aft position of the reel on the reel support arms.

BACKGROUND OF THE INVENTION

The conventional harvesting header comprises a frame for mounting on a crop harvesting machine for movement across ground carrying a crop to be harvested, the frame defining a working width of the header, a table mounted on the frame across the width of the header for receiving the crop when cut for transportation along the header, a cutting knife along a front edge of the table for cutting the crop and a reel mounted above the knife and the table for controlling the crop as it moves onto the table. The reel comprises a main elongate support beam and a plurality of bats at angularly spaced positions around the main beam. A pair of support arms carried on the frame and extending forwardly therefrom support the beam at a forward end of the arms.

A reel of this type is shown in U.S. Pat. No. 4,776,155 and related U.S. Pat. No. 4,752,809 both of which are assigned to the present assignee. The second of the above patents is particularly directed to the bat angle adjustment system which controls the angle of the bats as they rotate about the main longitudinal axis of the beam so as to maintain an angle of the bats relative to a vertical plane through the bat substantially constant as the bats move through the region adjacent the cutting knife. A further arrangement for adjustment of the reel in the field is shown in U.S. Pat. No. 5,768,870 also of the present assignee.

It is well known, as shown in the last of these patents that the reel is adjustable so as to vary the height of the reel by pivoting the support arms about their point of connection to the frame. Furthermore the position of the reel along the length of the support arms is adjustable so as to move the reel and particularly the bats forwardly and rearwardly relative to the cutting knife for different crop conditions.

Some headers include hydraulic cylinders provided at the support arms for actuating fore and aft sliding movement of the reel along the arms. However this expense is not always justifiable and hence may purchasers elect to have a header in which the position of the reel is adjusted manually. The reel is mounted on the arms by a slide member which rests over a top surface of the respective arm and can be moved manually fore and aft to effect the necessary adjustment. The top surface of the arm has a plurality of longitudinally spaced holes so that when the adjustment position has been selected, the operator can fasten the slide member to the top surface of the arm by one or more preferably two bolts through bolt holes in the slide member and selected ones of the plurality of holes in the arm.

While this adjustment technique is inexpensive, it requires considerable physical effort and there is no assist available in a situation where binding or jamming is occurring thus yet further increasing the force necessary to effect the movement.

SUMMARY OF THE INVENTION

It is one object of the present invention to provide an improved header which allows the fore and aft position of the header on the support arms to be adjusted while avoiding the cost and complexity of hydraulic adjustment cylinders.

According to the invention there is provided a crop harvesting header comprising:

a frame for mounting on a crop harvesting machine for movement across ground carrying a crop to be harvested, the frame defining a working width of the header;

a table mounted on the frame across the width of the header for receiving the crop when cut for transportation along the header;

a cutting knife along a front edge of the table for cutting the crop;

and a reel comprising:

a rotatable main elongate beam extending along the header generally parallel to the cutting knife;

a plurality of elongate bats mounted at angularly spaced positions around the main elongate beam for rotation therewith;

at least two reel support arms spaced along the width of the frame, each having a rear end mounted on the frame for vertical pivotal movement providing adjustment for raising and lowering the reel relative to the cutting knife and a forward end for supporting the main elongate beam;

the main beam being mounted on beam support members each carried on a respective one of the support arms for rotation of the beam relative to the support members about a main longitudinal axis thereof;

the beam support members being mounted on the support arms for sliding adjustment movement forwardly and rearwardly on the support arms so as to adjust the horizontal position of the beam relative to the cutting knife;

each support arm having a wall thereof with a plurality of longitudinally spaced holes therein;

and each beam support member having a sprocket mounted thereon which is rotatable about an axis on the beam support member, the sprocket having a plurality of sprocket teeth thereon for cooperating with the holes in the wall of the respective support arm such that rotation of the sprocket acts to drive the beam support member along the respective support arm.

Preferably the sprocket is arranged to be rotatable by manual operation of a lever for manual adjustment of the position of the reel.

Preferably the sprocket carries a nut operable by a wrench.

Preferably the beam support member includes an engagement wall having a surface arranged to slide along a cooperating surface of the wall of the support arm.

Preferably the engagement wall has at least one hole therein by which the engagement wall can be bolted to a selected one of the holes in the wall of the support arm.

Preferably the wall of the support arm is a top wall on which the beam support member rests.

Preferably the support arm is a channel member defining a top wall and two depending side walls and wherein the sprocket is mounted within the channel member.

Preferably the support arm includes a top wall on which the beam support member rests, wherein the sprocket is mounted on a mounting member attached to the beam support member and wherein the mounting member is located underneath the top wall in engagement with a bottom surface thereof to prevent lifting of the beam support member away from the support arm.

Preferably the sprocket is mounted on a mounting member attached to the beam support member and wherein the mounting member is located underneath the top wall in engagement with a bottom surface thereof to prevent lifting of the beam support member away from the support arm.

Preferably the support arm is a channel member defining the top wall and two depending side walls and wherein the sprocket and the mounting member are mounted within the channel member.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
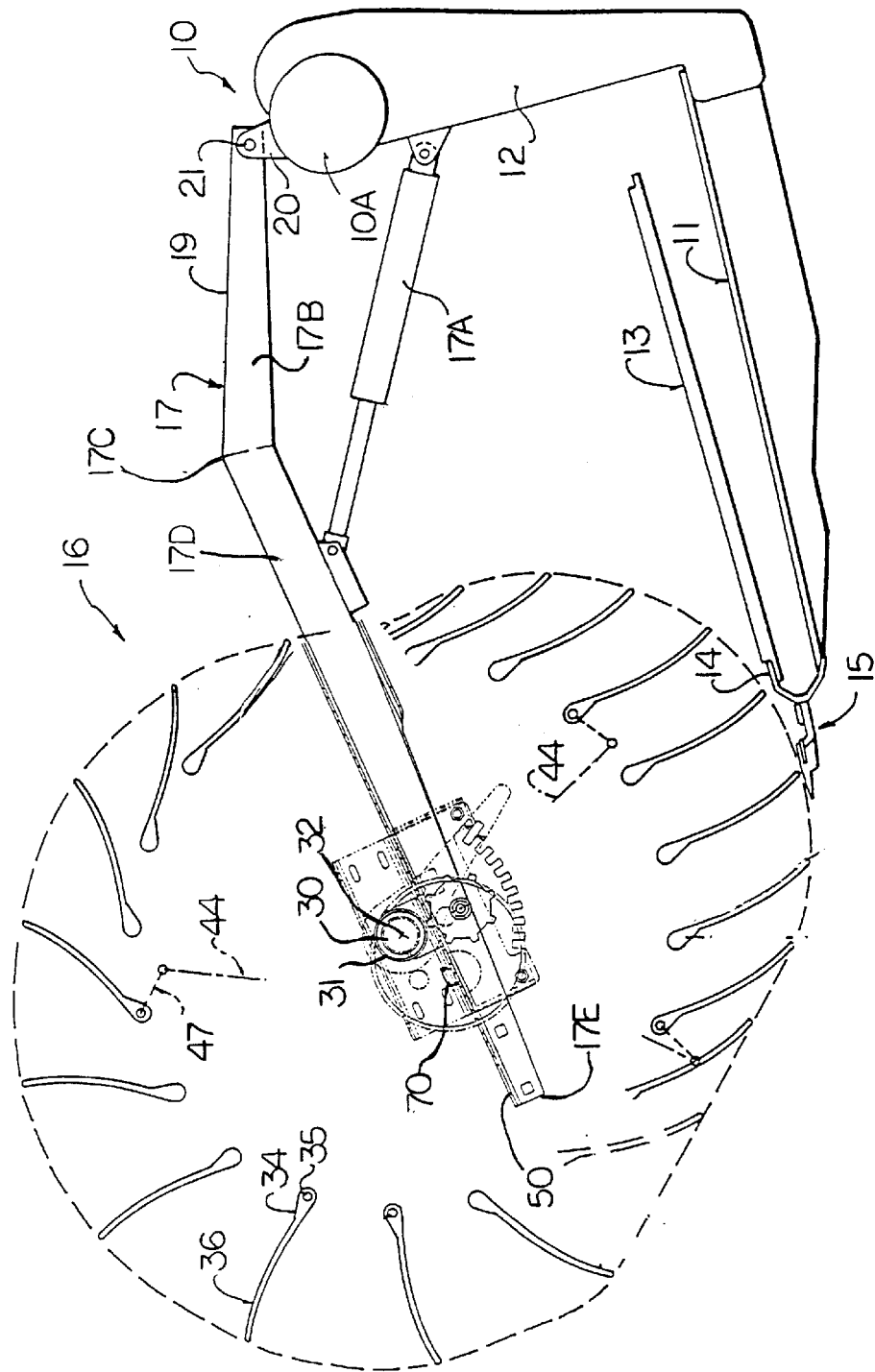
FIG. 1 is a side elevation view of the header according to the present invention.
Figure 2:
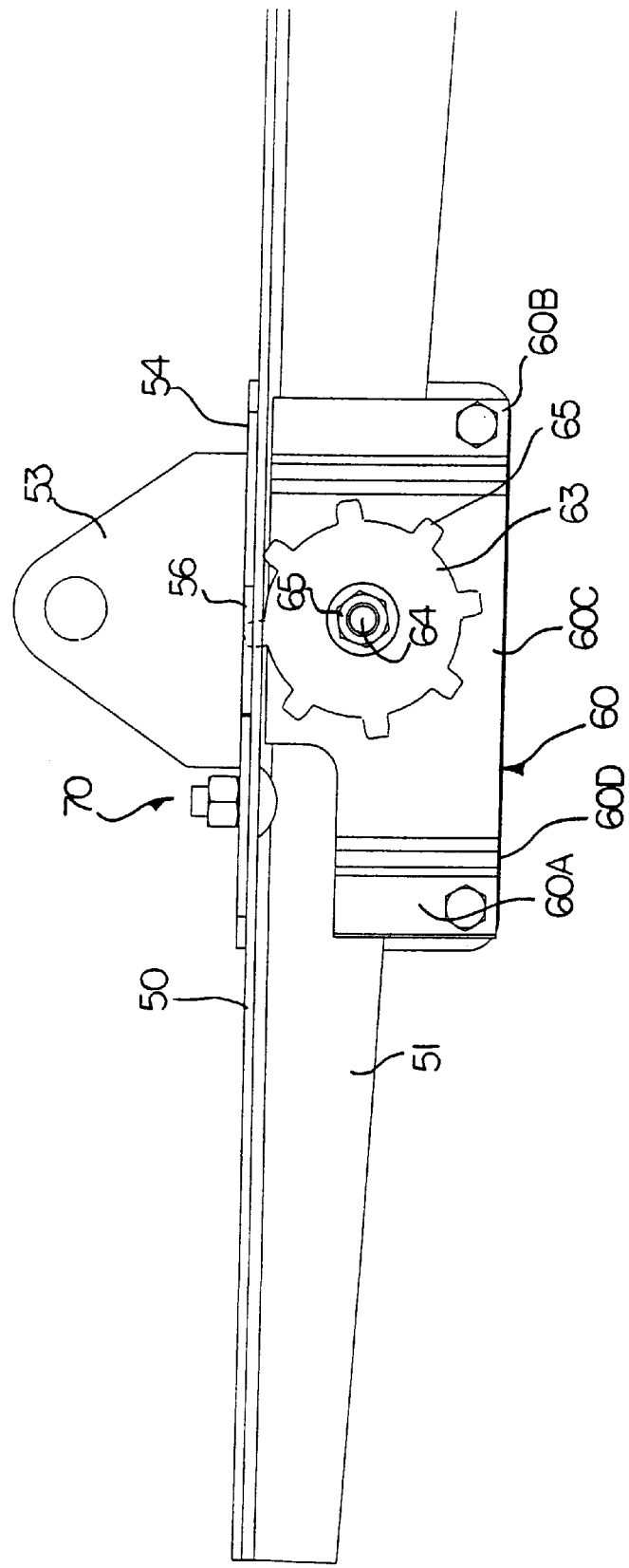
FIG. 2 is a partial side elevational view similar to that of FIG. 1 showing the clamping bolt removed and a wrench in place effecting adjustment movement of the beam support member.
Figure 3:
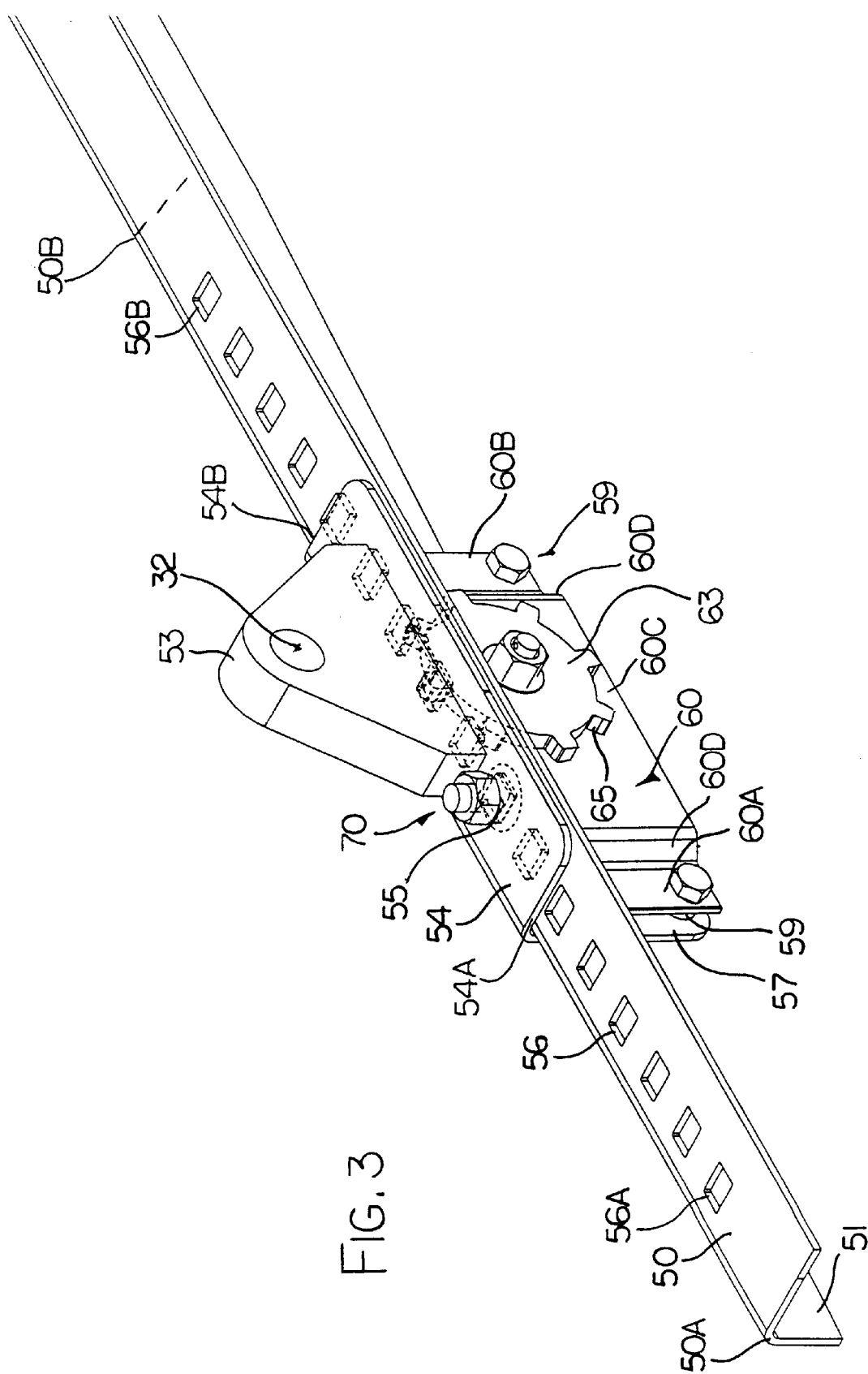
FIG. 3 is an isometric view of the parts shown in FIG. 2.

FIG. 1 shows schematically the general layout of the header according to the present invention. Thus the header comprises a main frame generally indicated at 10 including a main longitudinal beam 10A which extends across the full width of the frame and defines the width of the header. The frame further includes a table 11 which is mounted downwardly and forwardly of the main beam 10A and supported on the main beam by a plurality of braces 12. On top of the table 11 is mounted a draper or other conveyor 13 which carries the cut crop material along the header for discharge. At the front of the table is provided a knife support bracket 14 in the form of a generally U-shaped channel facing forwardly of the table. On the bracket 14 is mounted a sickle knife 15 which extends across the full width of the table and acts to cut a standing crop as the header is moved across the ground carrying the crop. A reel 16 is mounted on arm 17.

The construction of the reel is substantially the same as that shown and described in U.S. Pat. Nos. 4,776,155 and 5,768,870 of the present Assignees. However the reel can vary in design and is well known to one skilled in the art and therefore will not be described in full detail.

The reel comprises a main elongate beam 30 in the form of a cylindrical tube which is mounted on suitable bearings (not shown) so as to allow rotation of the beam 30 about a main longitudinal axis 32 of the beam. The beam carries a plurality of star shaped support elements (not shown) at spaced positions along the length of the beam with each support element having a number of arms equal to a number of bats 34 carried by the main beam 30. Each bat includes a support shaft 35 which is mounted in a bearing at the end of a respective arms. On the shaft is mounted a bat comprising an elongate body which supports a number of fingers 36 at longitudinally spaced positions along the length of the bat which project from the bat generally outwardly away from the axis 32.

The bat shafts 35 and their longitudinal axis thus rotate about the axis 32. At the same time each bat pivots about its respective shaft 35 so as to provide a variation in the angle of the fingers 36 relative to an axial plane joining the axis 32 and the shaft 35. The intention in the movement is maintain the bat fingers mutually parallel at least as they move through the working zone in which they contact the crop and more preferably throughout the full rotation around the reel axis. In order to achieve this, it is of course necessary that the bat fingers constantly adjust in angle relative to the axial plane passing through the respective bat axis.

The arms 17 are mounted for pivotal movement about a mounting pin 21 carried on a lug 20 welded to the top of the beam 10A. The arms 17 can be raised and lowered by hydraulic cylinders 17A operating between the underside of the arm and a front side of the support 12.

Each of the arms includes a rear portion 17B which extends upwardly and outwardly to a top apex 17C and a second portion 17D which extends downwardly and forwardly to a forwardmost end 17E. The portions 17B and the rear part of the portion 17D is formed of a tubular member. A forward part of the portion 17D is defined by a angle iron including a top wall 50 and a depending side wall 51. A part of the side wall may include a flange at the bottom end to provide a stiffening effect for structural strength.

The shaft 30 is carried upon two beam support members 53 each carried on the respective arm 17. The beam support member 53 comprises a horizontal plate 54 which can slide across and rest upon the upper surface of the top wall 50. The plate 54 has a hole 55 by which the plate can be bolted to the top wall 50. For this purpose the top wall 50 has a plurality of square holes 56 at longitudinally spaced positions along its length from a first one of the holes 56A to a last one of the holes 56B. This allows the position of the plate to be moved from a forwardmost position where its edge 54A aligns roughly with an edge 50A of the top wall 50 of the arm to a rearward position in which a rear edge 54B of the plate reaches the location indicated at 50B just beyond the hole 56B. Fore and aft movement of the support member therefore effects fore and aft movement of the beam of the reel between the required adjustment positions for required operation of the header.

Figure 4:
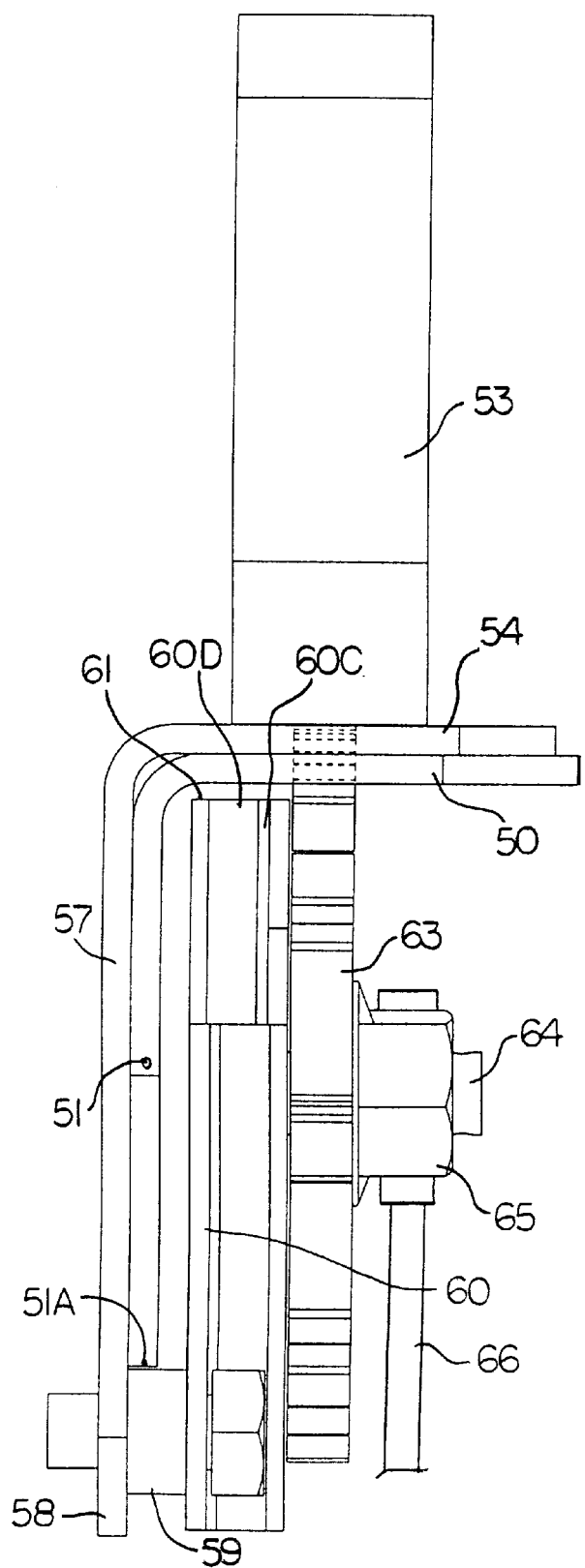
FIG. 4 is a cross-sectional view along the lines 4—4 of FIG. 2.

The beam support member 53 further includes a downwardly depending front plate 57. This plate is parallel to the front side wall 51 of the channel of the support arm and may be in contact with that wall as shown in FIG. 4 or it may be spaced forwardly from that wall. The front plate 57 includes a bottom portion 58 which extends to a position below the bottom edge 51A of the side wall 51 so that a portion is exposed below.

The support member 53 is shown only schematically and may further include a mounting for the bearings of the shaft and for the operating elements of the reel which are not described herein as they are not relevant to the particular structure with which the present invention is concerned and since they are well known to or can be found by a person skilled in the art from the previously described patents and from products available in the marketplace.

The bottom portion 58 of the plate 57 which extends below the bottom edge of the wall 51 carries a pair of rearwardly projecting mounting elements 59 each of which extends beyond the wall 51 to a mounting member 60 in the form of a vertical plate. The plate extends upwardly from the support brackets 59 to a top edge 61 which is located immediately adjacent or in contact with the bottom surface of the top wall 50. The plate 60 has two ends 60A, 60B and a center section 60C bent into a vertical plane parallel to but spaced from the ends with the center section located just to one side of the holes 56. The bent portions 60D of the plate 60 effect stiffening of the plate. The brackets 59 comprise a pair of bolts with spacer sleeves surrounding the bolts thus clamping the plate 60 rigidly to the front plate 57 and holding it in fixed parallel position relative to the plate 57.

A sprocket 63 is mounted on a spindle 64 at the plate portion 60C so that the sprocket lies in a plane parallel to the plate 60 with the spindle 64 extending at right angles to the plate 60 and rearwardly therefrom away from the side walls 51 of the arm. The sprocket is thus mounted for rotation about the axis of the spindle 64. The sprocket has on its outer periphery a plurality of sprocket teeth 65 which are arranged at a spacing so as to match the spacing of the holes 56 in the top wall 50.

The sprocket 63 carries on its exposed face a nut 65 which can be grasped by a wrench 66 engaged onto the nut from behind. The wrench is thus operated in movement back and forth so as to effect rotation of the nut 65 thus driving rotation of the sprocket 63.

As the sprocket is fixed to the plate 60 which is attached to the beam support member 53, rotation of the sprocket causes the teeth to grasp each hole 56 in turn and thus to drive the sprocket longitudinally along the wall 50.

An operator therefore using the wrench can manually quickly move the support member 53 to a required position along the length of the support arm. When the support member 53 is moved to the required position and the hole 55 in the plate 54 is suitably aligned with a selected one of the holes 56, the wrench is removed and a bolt 70 inserted in place through the hole 55 and the selected hole 56. The bolt 70 thus ensures that the beam support member 53 is maintained in its fixed position at the required location along the support arm. If further adjustment is required, the bolt 70 is removed and the sprocket actuated by the wrench 66 to move again to the required position.

The use of the sprocket ensures that the beam support member can be moved despite any binding or resistance due to the mechanical advantage obtained by the wrench 66.

The sprocket is protected in its location behind the plate 52 and underneath the plate 50 of the arm so that it is not exposed to view nor to damage nor to contamination. The sprocket co-operates with existing locating holes in the support arm and therefore the additional elements necessary for this mechanical adjustment system are relatively limited.

Furthermore, the mounting plate 60 which is located underneath the arm member and adjacent or in abutment with the top wall 50 is rigidly attached to the support member 57 and thus prevents the support member from lifting away from the top surface of the wall 50 due to changes in torque in the reel or due to shock loading over bumpy ground. It is possible therefore to use only a single bolt 70 holding the plate 54 onto the top wall 50 so that the adjustment and locking can be effected quickly and easily without the danger that the plate will be twisted or the bolt broken by the tendency of the rear edge of the plate 54 to lift away from the top wall 50.

While the preferred embodiment is described above, the sprocket can be rotated by other manually operable tools such as a ratchet lever permanently attached thereto. The use of a wrench or a nut is not therefore essential to the invention.

In some arrangements, the use of the bolt 70 to connect the plate 54 to the arm may be omitted and in some cases may be replaced by other fastening techniques.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A crop harvesting header comprising:
   a frame for mounting on a crop harvesting machine for movement across ground carrying a crop to be harvested, the frame defining a working width of the header;
   a table mounted on the frame across the width of the header for receiving the crop when cut for transportation along the header;
   a cutting knife along a front edge of the table for cutting the crop;
   and a pickup reel comprising:
   a rotatable main elongate beam extending along the header generally parallel to the cutting knife;
   a plurality of elongate bats mounted at angularly spaced positions around the main elongate beam for rotation therewith;
   at least two reel support arms spaced along the width of the frame, each having a rear end mounted on the frame for vertical pivotal movement providing adjustment for raising and lowering the reel relative to the cutting knife and a forward end for supporting the main elongate beam;
   the main beam being mounted on beam support members each carried on a respective one of the support arms for rotation of the beam relative to the support members about a main longitudinal axis thereof;
   the beam support members being mounted on the support arms for sliding adjustment movement forwardly and rearwardly on the support arms so as to adjust the horizontal position of the beam relative to the cutting knife;
   each support arm having a wall thereof with a plurality of longitudinally spaced holes therein;
   and each beam support member having a sprocket mounted thereon which is rotatable about an axis on the beam support member, the sprocket having a plurality of sprocket teeth thereon for cooperating with the holes in the wall of the respective support arm such that rotation of the sprocket acts to drive the beam support member along the respective support arm.

2. The header according to claim 1 wherein the sprocket is arranged to be rotatable by manual operation of a lever for manual adjustment of the position of the reel.

3. The header according to claim 2 wherein the sprocket carries a nut operable by a wrench.

4. The header according to claim 1 wherein the beam support member includes an engagement wall having a surface arranged to slide along a cooperating surface of the wall of the support arm.

5. The header according to claim 4 wherein the engagement wall has at least one hole therein by which the engagement wall can be bolted to a selected one of the holes in the wall of the support arm.

6. The header according to claim 1 wherein the wall of the support arm is a top wall on which the beam support member rests.

7. The header according to claim 1 wherein the support arm is a channel member defining a top wall and two depending side walls and wherein the sprocket is mounted within the channel member.

8. The header according to claim 1 wherein the support arm includes a top wall on which the beam support member rests, wherein the sprocket is mounted on a mounting member attached to the beam support member and wherein the mounting member is located underneath the top wall in engagement with a bottom surface thereof to prevent lifting of the beam support member away from the support arm.

9. The header according to claim 6 wherein the sprocket is mounted on a mounting member attached to the beam support member and wherein the mounting member is located underneath the top wall in engagement with a bottom surface thereof to prevent lifting of the beam support member away from the support arm.

10. The header according to claim 9 wherein the support arm is a channel member defining the top wall and two depending side walls and wherein the sprocket and the mounting member are mounted within the channel member.

\* \* \* \* \*